(12) United States Patent
Barnes et al.

(10) Patent No.: US 6,789,870 B2
(45) Date of Patent: Sep. 14, 2004

(54) DROP QUANTITY CALIBRATION METHOD AND SYSTEM

(75) Inventors: Arthur H. Barnes, Battle Ground, WA (US); Matthew A. Shepherd, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/154,714

(22) Filed: May 24, 2002

(65) Prior Publication Data

US 2003/0218648 A1 Nov. 27, 2003

(51) Int. Cl.$^7$ .................... B41J 29/393; B41J 2/195; B41J 29/38; B41J 2/165; B41J 2/145
(52) U.S. Cl. .................... 347/19; 347/7; 347/14; 347/23; 347/41; 347/24
(58) Field of Search .................... 347/19, 14, 12, 347/10, 11, 9, 8, 40, 23, 42, 43, 5, 41

(56) References Cited

U.S. PATENT DOCUMENTS

| 4,523,200 A | * | 6/1985 | Howkins ............ 347/11 |
| 5,975,677 A | * | 11/1999 | Marler et al. ............ 347/40 |
| 6,034,711 A | | 3/2000 | Trask |
| 6,191,867 B1 | | 2/2001 | Shor |
| 6,310,698 B1 | | 10/2001 | Samworth |

FOREIGN PATENT DOCUMENTS

| EP | 0794657 A2 | 9/1997 |
| JP | 62251628 A1 | 11/1987 |
| WO | WO0204220 A1 | 1/2002 |

* cited by examiner

Primary Examiner—Stephen D. Meler
Assistant Examiner—Charles Stewart, Jr.

(57) ABSTRACT

A method and system for calibrating a device having a first fluid source that ejects a first drop quantity and a second fluid source that ejects a second drop quantity by, for example, printing a pattern having a first portion and a second portion; obtaining a relationship between the first drop quantity and the second drop quantity from the pattern; and adjusting data used to determine quantities of fluid to eject from the first or second fluid sources based on the relationship between the first and second drop quantities. Other embodiments of the invention are directed to a calibration apparatus and system.

26 Claims, 6 Drawing Sheets

DROP QUANTITY CALIBRATION METHOD AND SYSTEM

BACKGROUND

Inkjet printers have become increasingly sophisticated and can generate more complex images than before, including color photographic-quality images. Some inkjet printers have two or more pens, such as a high dye-load pen and a low dye-load pen, or multiple chambers within a single inkjet pen to handle a wide range of colors and hues. Differences in drop volume and/or drop weights between the pens, however, may cause noticeable color variations and/or hue shifts and generate images that do not accurately replicate desired colors.

SUMMARY OF THE INVENTION

Accordingly, an embodiment of the invention is directed to a method of calibrating a device having a first fluid source that ejects a first drop quantity and a second fluid source that ejects a second drop quantity. An embodiment of the method comprises printing a pattern having a first portion and a second portion, wherein the first portion is printed by the first fluid source and the second portion is printed by the second fluid source; obtaining a relationship between the first drop quantity and the second drop quantity from the pattern; and adjusting data used to determine quantities of fluid to eject from the first fluid source or the second fluid source based on the relationship between the first drop quantity and the second drop quantity.

Another embodiment of the invention is directed to a calibration apparatus for a device having a first fluid source that ejects a first drop quantity to form a first region and a second fluid source to eject a second drop quantity to form a second region. The apparatus comprises an optical sensor to generate output from scanning the first portion and the second portion; and a processor arranged to receive the output, wherein the processor includes a configuration to determine a relationship between the first drop quantity and the second drop quantity using the output.

The embodiments described above are not intended to be exhaustive and other aspects of the invention will be apparent to those skilled in the art after reviewing the drawings and the detailed description below.

DETAILED DESCRIPTION OF THE EMBODIMENTS

Figure 1:
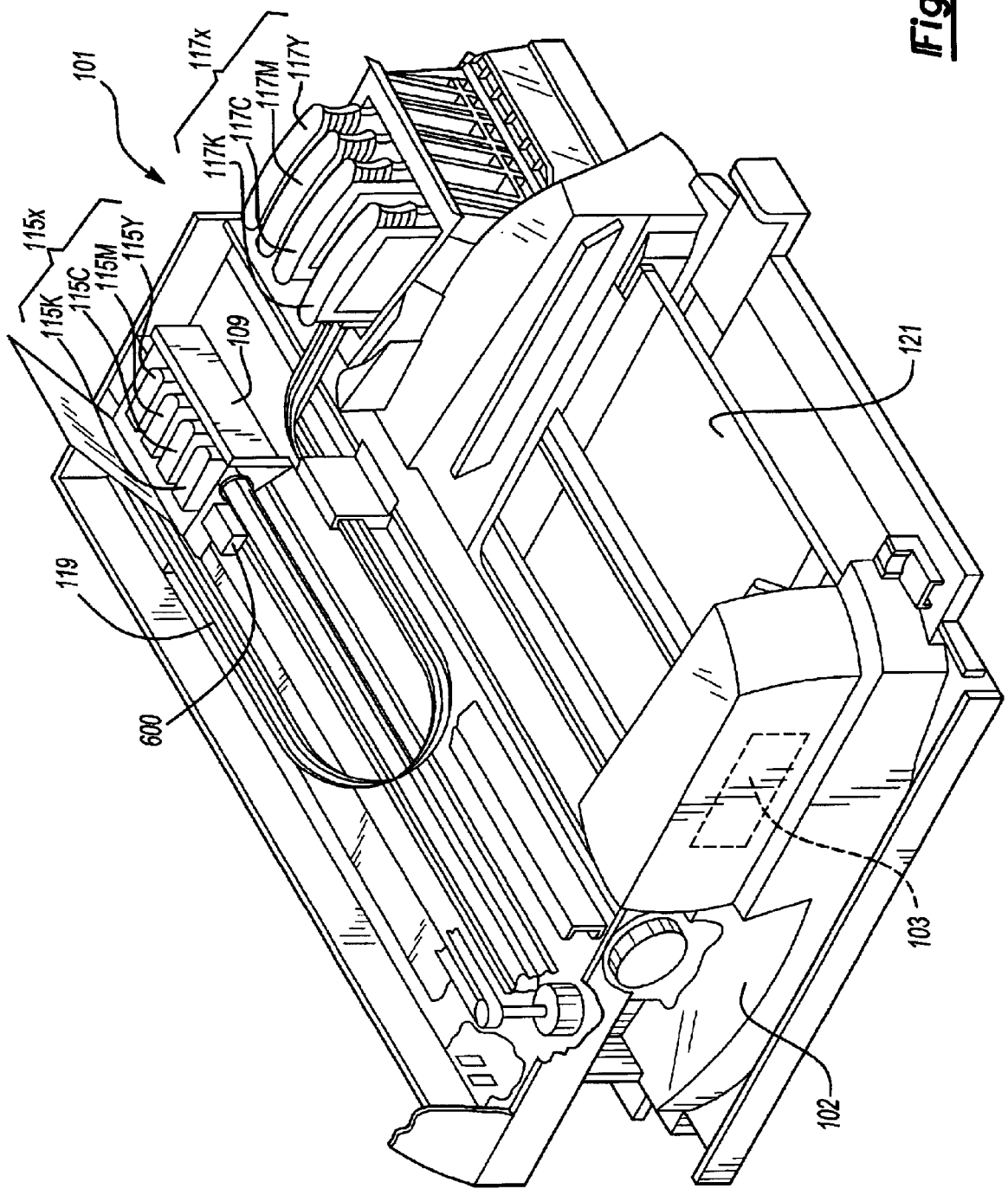
FIG. 1 illustrates a printing apparatus incorporating an embodiment of the invention.

FIG. 1 illustrates a printer 101 that may incorporate an embodiment of the invention. For convenience in describing embodiments of the invention in the description below, all types of imaging systems are hereinafter referred to as "printers," all types, sizes, and compositions of print media are also referred to as "paper," and all fluid compositions are referred to as "ink;" no limitation on the scope of the embodiments of the invention are intended nor should any be implied. Moreover, imaging systems may also include, without limitation, copiers, fax machines, all-in-one imaging devices, and any other system that forms images by ejecting colored fluid onto a print medium. Further as used herein, the term "drop quantity" or "drop volume" are not intended to be limited to volumetric measurements or quantities, and are intended to include other quantifiable quantity and/or spatial measurements or quantities, for example, without limitation, volume, mass, density, and/or weight. For instance, the term "drop quantity" can generally be used interchangeably with the terms "drop volume," "drop weight," or "drop density."

Housing 102 preferably encloses the electrical and mechanical operating mechanisms of the printer 101. Operation is administrated by an electronic processor 103 (such as a microprocessor or application specific integrated circuit ("ASIC") controlled printed circuit board) connected appropriately to a computer (not shown). If desired, general purpose microprocessors or ASIC-executing firmware or software may be used to program and execute imaging, printing, print media handling, and/or control functions and logic operations. In an embodiment, the processor 103 functions may be performed by the computer, by electronics on-board the printer 101, of by interactions therebetween. The term "processor" as used herein encompasses these functions, whether performed by a computer, the printer 101, an intermediary device therebetween, or by a combined interaction of such elements.

In a preferred embodiment, ink-jet pens 115X may be individually mounted in a movable carriage 109. For example, without limitation, in a "full color" system, inks can be included for subtractive primary colors, i.e., cyan (X=C), yellow (X=Y), magenta (X=M) and true black (X=K). Further, if desired, an ink fixer (X=F) may also be included. However, embodiments of the invention are not so limited and also contemplate the use of an integrated pen system, such as that in which pens 115X themselves may include one or more chambers (not shown). For instance, an integrated embodiment may include a plurality of pens (e.g., two pens) having a plurality of chambers (e.g., three) per pen. Reusable printhead systems are fluidically coupled by tubing 119 to replaceable or refillable ink reservoirs 117X (generally, in a full color system, inks preferably for the subtractive primary colors, cyan (X=C), yellow (X=Y), magenta (X=M) and true black (X=K) are provided; ink fixer (X=F) solutions are also sometimes provided). In a preferred embodiment, each pen 115X operates using an internal back pressure regulator for allowing transfer of ink from a respective reservoir 117X while maintaining the appropriate back-pressure needed for the operation of each printhead of each pen. If desired, replaceable ink jet cartridges, such as those having a self-contained ink reservoir and back-pressure regulating mechanism, may be employed. Once a printed page is completed, the print medium is typically ejected onto an output tray 121.

Preferably, the embodiments of the invention operate within the printer 101 by comparing drop volumes of two or more pens and/or ink chambers 115X and using this comparison to reduce or remove color imbalances between the pens and/or chambers. In accordance with an embodiment of the invention, the relationship between the drop volumes may be determined without requiring a unique reference or calibration standard. Further, because primary and secondary inks may be printed on the same paper or media, in general, the effects of the paper or media will be relatively negligible. Two ink or fluid sources 115X, such as a high dye-load pen and a low dye-load pen, may be considered in a paired set, but embodiments of the invention may be used in any application that ejects ink from more than one pen (including those of different types) and/or chamber. In an embodiment, one pen is referred to as a "reference pen" and another pen is referred to as a "secondary pen". The terms "reference" and "secondary" correspond to the portions of a test pattern printed by each pen 115X and do not reflect the relative importance of the pens 115X during an actual printing operation.

Figure 2:
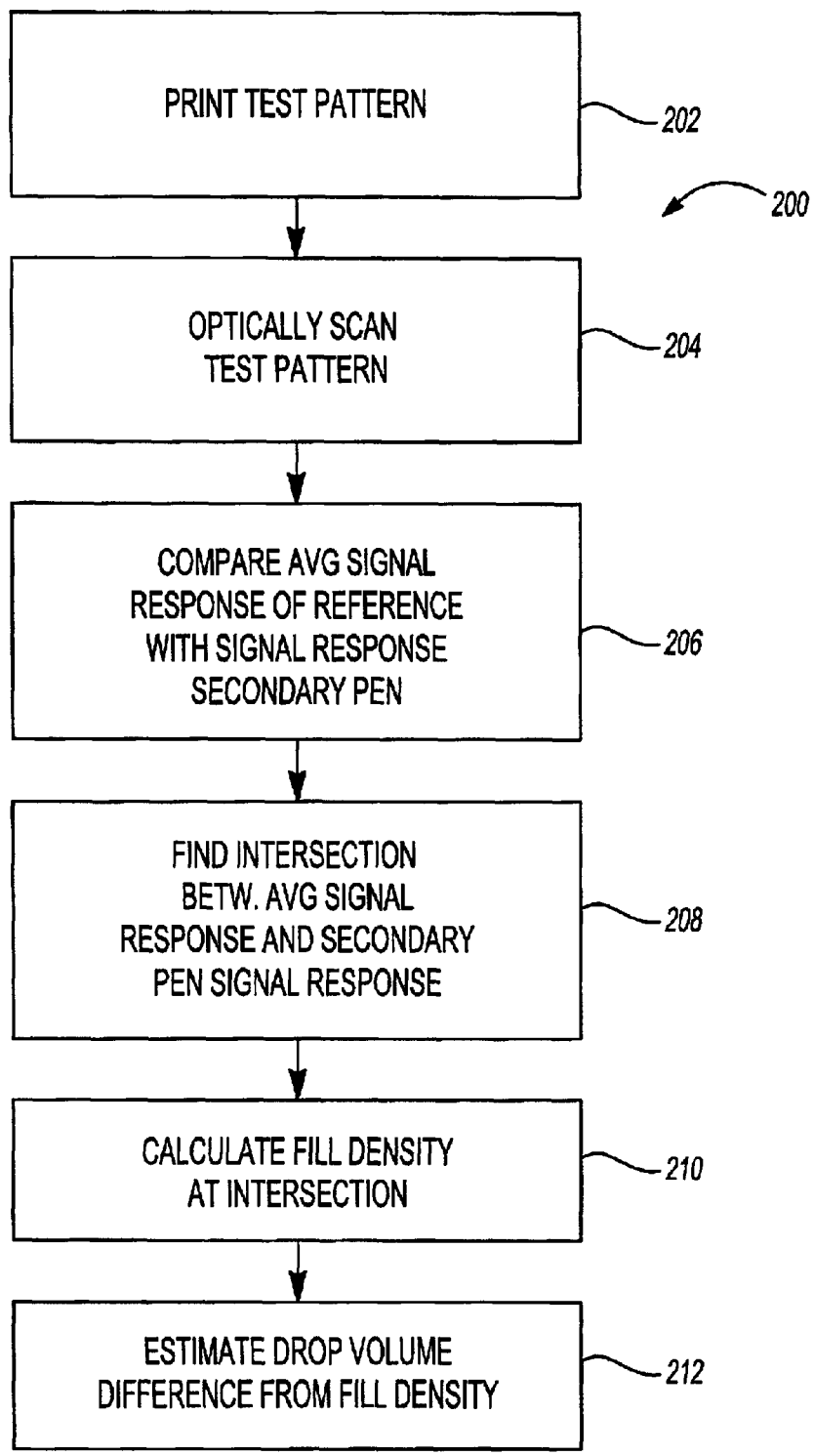
FIG. 2 is a block diagram illustrating a method according to an embodiment of the invention.
Figure 3:
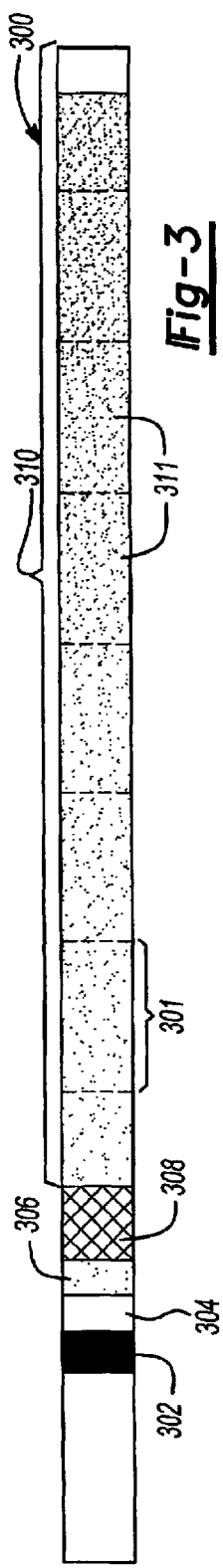
FIG. 3 is a representative diagram of a test pattern generated according to an embodiment of the invention.

FIG. 2 is a block diagram illustrating a method according to an embodiment of the invention and FIG. 3 illustrates one example of a possible test pattern generated in the method shown in FIG. 2. Referring to FIGS. 2 and 3, the method 200 according to an embodiment of the invention involves printing a test pattern (block 202), which will later be scanned optically to detect drop differences between the two pens being compared. In the embodiment explained below, it is assumed that the relationship between, for instance, cyan and magenta in a low dye-load pen and, for example, yellow in a high dye-load pen is the intended focus. Embodiments of the invention may be applied, however, to any color relationship between multiple pens without departing from the scope of the embodiments of the invention.

In this example, the ratio between the drop quantites of the two pens in a matched pen pair affects the "blue-yellow shift", or the degree of blue or yellow appearing in a printed image. For example, if the specified functional (e.g., nominal or optimum) drop quantity ratio between the high-dye load pen and the low dye-load pen is 5.0 nanograms/4.4 nanograms to obtain a correct or preferred balance of cyan and magenta to yellow, a ratio higher than the specified functional ratio may create an image that is too yellow, while a ratio lower than the specified functional ratio may create an image that is too blue. Ratio changes may occur if, for example, the drop quantity of either pen deviates from the specified functional drop quantity. If such variations are left uncorrected, the generated chroma values generated by the pen pair may vary from, for example, 0 to 20 for a given color, which may be an unacceptably high variance for some applications.

FIG. 3 illustrates an example of a test pattern 300 that can be used to determine a drop volume relationship between the two pens to adjust or correct for "blue-yellow shift". The various portions of the test pattern 300 may be printed at selected increments along, for example, a width of a sheet of print media. Each increment can represent a "tile" 301. The increment size may be selected based on several designated factors, including, without limitation: anticipated extreme fill density ranges for pens being calibrated (e.g., a range between 14% and 41%); the field of view for the optical sensor (e.g., if the optical sensor has a viewing field of 1.25 mm, for example, the tile 301 may have a length of 2.5 mm, equivalent to two field views, to better prevent or reduce the influence of the preceding or following tiles 301 from influencing the results from the portion being examined by the sensor); and the resolution needed to determine a drop quantity difference. For example, in a preferred embodiment, each increment 301 may be represented as a grid, such as a 10×10 grid, with 100 possible ink deposition points.

The pattern 300 starts with a spit bar 302 generated by both pens to clear nozzles in the pens, stabilize pen temperatures, and stabilize drop volumes before generating the remainder of the test pattern. After the spit bar 302, the pattern 300 includes a white space 304, a light absorbing portion 306, and a reference portion 308. The light absorbing portion 306 absorbs stray light and prevents or reduces the influence of unwanted signals on the results of optically scanning. The light absorbing portion 306 in a preferred embodiment is light black and printed in one tile.

Preferably, after the light absorbing portion 306 is printed, the reference portion 308 is printed by the reference pen at a known reference fill density. The reference fill density can have a value that is between the maximum and minimum fill density of the secondary pen. In an embodiment, the reference fill density is selected so that the calculated (e.g., average) response of the reference pen at the reference fill density will correspond to a point between the minimum and maximum fill densities of the secondary pen. For example, if the minimum fill density of a secondary pen is 14% and the maximum fill density is 41%, the reference fill density could lie between 14% and 41%. Of course, other minimum, maximum, and reference fill density values can be selected for alternate embodiments.

The color of the reference portion 308 is selected based on, for example, a spectral response of an optical sensor or scanner to be used for scanning the test pattern 300. In one example, the test pattern 300 will eventually be scanned with an optical sensor having a light source with a light output between 420 nm and 470 nm. To accommodate light sources in this range, a high dye-load reference pen may eject, for example, 19 parts magenta ink and 12 parts yellow ink to generate a reference portion 308 having a fill density of 19% magenta and 12% yellow. If the test pattern 300 will be scanned using a 420–470 nm light source, cyan ink is preferably not used to generate the reference portion 308 because cyan ink may not absorb the light from the light source as well and therefore may yield less useful information during the scanning process. Further, although a combination of two colors is used to generate the reference portion 308 in this embodiment, the reference portion 308 may be a single color or incorporate different color combinations depending on the specific characteristics of the light source. In an embodiment, the reference portion 308 color is selected to better ensure that the spectral response generated by the reference portion 308 will remain sufficiently consistent even if there are small variations between the optical sensors generating the response for the same test pattern 300.

In a preferred embodiment, after the reference pen prints the reference portion 308, the secondary pen prints a test portion 310 containing one or more test tiles 311. In an embodiment, the test portion 310 has a smooth ink gradation representing increasing fill densities generated by the secondary pen. The secondary pen may generate the ink gradation over multiple test tiles 311, each test tile 311 having a fill density that is greater than the previous test tile 311. To do this, the secondary pen may fire ink at increasing fill densities along each increment 301 to form each test tile 311. For example, if each test tile 311 is represented by the 10×10 deposition point grid (such as noted above), the first test tile 311 may have 14 out of its 100 ink deposition points printed with ink (i.e., a fill density of 14%), while subsequent test tiles 311 may have fill densities increasing at a rate of 1% per test tile 311 along the test portion 310 up to 41% or some other selected or predetermined ending point.

Note that other starting and ending levels may also be used to print the test portion 310. In an embodiment, the starting and ending drop volume and fill density levels corresponding to a minimum and a maximum fill density for the secondary pen. The maximum fill density may correspond to, for example, a saturation threshold at which an increase in fill density would not change the optical sensor response. Further, the minimum fill density may be chosen to cover an expected or anticipated drop volume variation (e.g. based on manufacturing tolerances) between different pens. Regardless of the specific starting and ending values and the fill density increment between each test tile 311, the response of the secondary pen in generating the test tiles 311 will determine where the secondary pen drop volume corresponds with the reference pen drop volume to obtain the drop quantity ratio (e.g., 5.0 nanograms reference/4.4 nanograms secondary).

In an embodiment, the secondary pen is a low dye-load pen and the test tiles 211 are printed with black ink from the low dye-load pen. Black low dye-load ink often provides a preferred specified or an optimum signal response for certain light sources, such as the 420–470 nm light source noted in the example above. In short, the example described herein assumes that the 19% magenta/12% yellow ink reference combination represents the drop quantity of the reference pen and that the black ink represents the drop quantity of the secondary pen.

Figure 4:
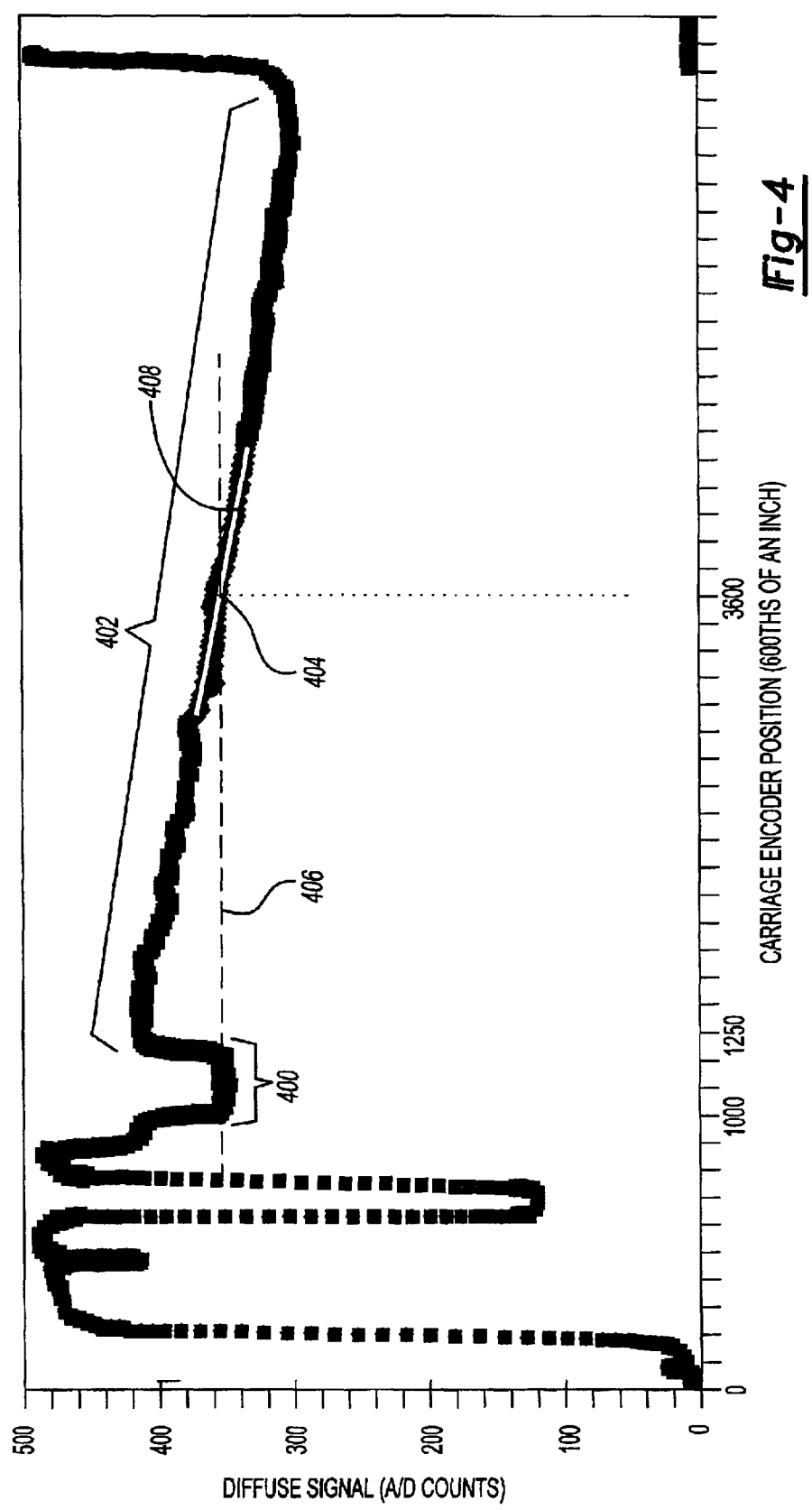
FIG. 4 is a graph illustrating an optical scan of the test pattern of FIG. 3 generated according to an embodiment of the invention.
Figure 7:
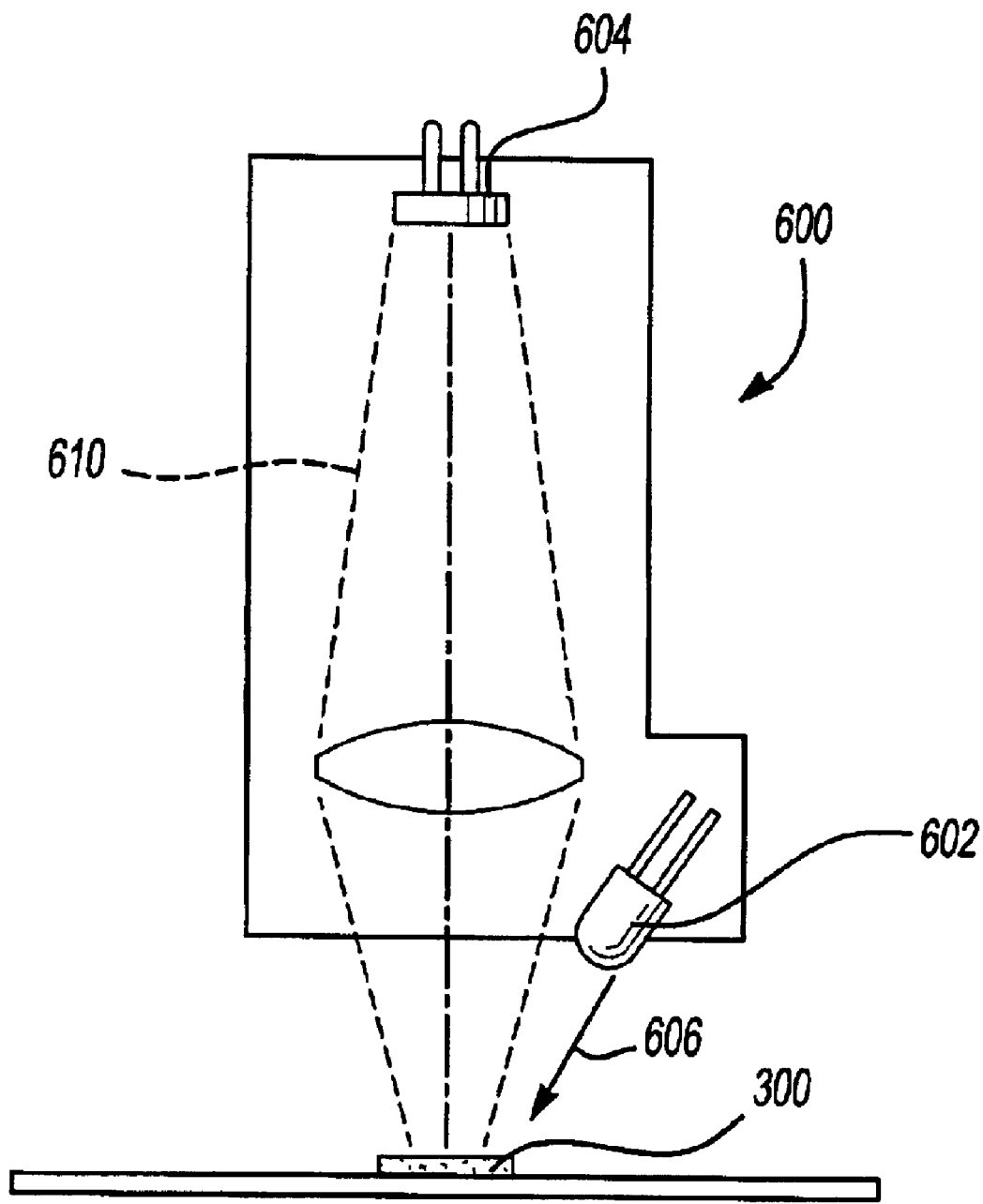
FIG. 7 is a diagram of an embodiment of an optical sensor used to generate the test pattern scan such as that shown in FIG. 4.

Referring back to the method shown in FIG. 2, the test pattern 300 is optically scanned (block 204) with an optical sensor, such as the optical sensor shown in FIG. 7. Preferably, an optical sensor records the signal levels of the test pattern 300 during the entire scan. In a preferred embodiment, the optical sensor first scans the reference portion 308 and measures a calculated (e.g., an average) signal response of the reference portion 308. As shown in FIG. 4, the calculated signal response 400 for the reference portion 308 is relatively constant over its corresponding increment 301 because the color and the fill density of the reference portion 308 is also relatively constant. The signal response of each test tiles 311, however, varies as the fill density varies. As shown in the Figure, the signal response 402 for the test tiles 311 gradually decreases as the fill density of the test portion 310 increases along the test pattern 300.

Preferably, once the entire test pattern 300 has been scanned (block 204), the processor 103 compares the calculated (e.g., average) signal response of the reference portion 400 with the signal response of the test portion 402 (block 206) and finds an intersection point 404 between the calculated (e.g., average) reference portion signal response 400 with the test portion signal response 402 (block 208). In an embodiment, the starting and ending portions of the reference portion signal response are trimmed before calculating the calculated signal response 400 to better ensure that the calculated signal response 400 is calculated or determined from a more stable signal and not transient data generated as the optical sensor measures the start and end of the reference portion 400. For example, without limitation, embodiments of the invention may scan a subject pattern a plurality of times (e.g., four) and then average the associated signals at each position. In an embodiment, the average signal response of the scans can then be used in connection with a line fitting technique or other mathematical technique. However, it is important to note that embodiments of the invention are not limited to a specified number of scans and any number of scans can be employed.

In an embodiment, a line 406 representing the calculated reference portion signal response 400 is extended until it crosses the test portion signal response 402 at the intersection point 404. The optical sensor processor then creates a fit line 408 based on a selected number of data points before and after the intersection point 404. The fit line 408 may also be generated using a variety of mathematical equations and/or approximation computations, however, a least squares fit method is preferred to better ensure that stray data points in the test portion signal response 402 do not give an undesirably skewed or an inaccurate representation of the actual test portion signal response 402. In an embodiment, for example, the sensor samples every fourth data point among 600 data points before and 600 data points after the intersection point 404. The fit line 408 is then generated from the sampled data points, and the intersection point 404 is re-evaluated and, if needed, re-adjusted to correspond with the point at which the calculated (e.g., average) reference portion signal response 406 intersects with the fit line 408.

In a preferred embodiment, once the intersection point 404 has been found, the processor 103 determines the position in the test portion 300 at which the intersection takes place to calculate a corresponding fill density for a secondary pen (block 210). Preferably, the optical sensor stores a corresponding position for each signal response. Further, the starting point of the test portion 310 and the increment size 301 of each test tile 311 is known (or can be determined). By correlating the intersection point 404 with a given position on the x-axis of the test pattern 300 generated by the optical sensor and determining the fill density of the test tile 311 in the test pattern 300 corresponding to that position, the fill density of a secondary pen at that position can be determined. In the particular example shown in FIG. 4, the intersection point 404 appears approximately at position 3600. By knowing the dimensions of each test tile, and knowing the starting location/position, and the fill % of the associated pattern, the fill % at the match position can be determined. In a preferred embodiment, the carriage system or pen transport system to which the sensor is mechanically and electrically attached, is driven by a servo system that utilizes an optical encoder to read position changes off of an encoder strip. The sensor and processor can also be used to find the edge of the test pattern. The foregoing specific values are for illustrative purposes only and are meant to show the technique for correlating the intersection point 404 with the corresponding fill density in the secondary pen; the example is not meant to be limiting in any manner.

The fill density of the secondary pen at the intersection point 404 is then converted into a relative drop quantity value that reflects a relationship between the secondary pen and the reference pen such as a drop volume difference between the secondary pen and the reference pen (block 212). In an embodiment, the drop volumes of the reference and secondary pens, in nanograms×1000, are represented as follows:

$$\text{reference pen drop volume}=75x+2700 \tag{1}$$

$$\text{secondary pen drop volume}=-75x+7100 \tag{2}$$

where x=the fill density. Note that the constant values in these equations are for illustrative purposes only and embodiments of the invention are not limited to the values described above. These equations indicate the drop volume that a properly or sufficiently matched reference pen and secondary pen could have to reduce the magnitude of or better prevent undesirable shifts in color, hue, and/or chroma. For instance, such drop volume equations can estimate a drop volume value that can be used to cause an associated color mapping system to adjust or scale the total number of drops that are deposited to better achieve "correct" or desired color rendering (e.g., to better match the color pens would nominally deliver).

Figure 5:
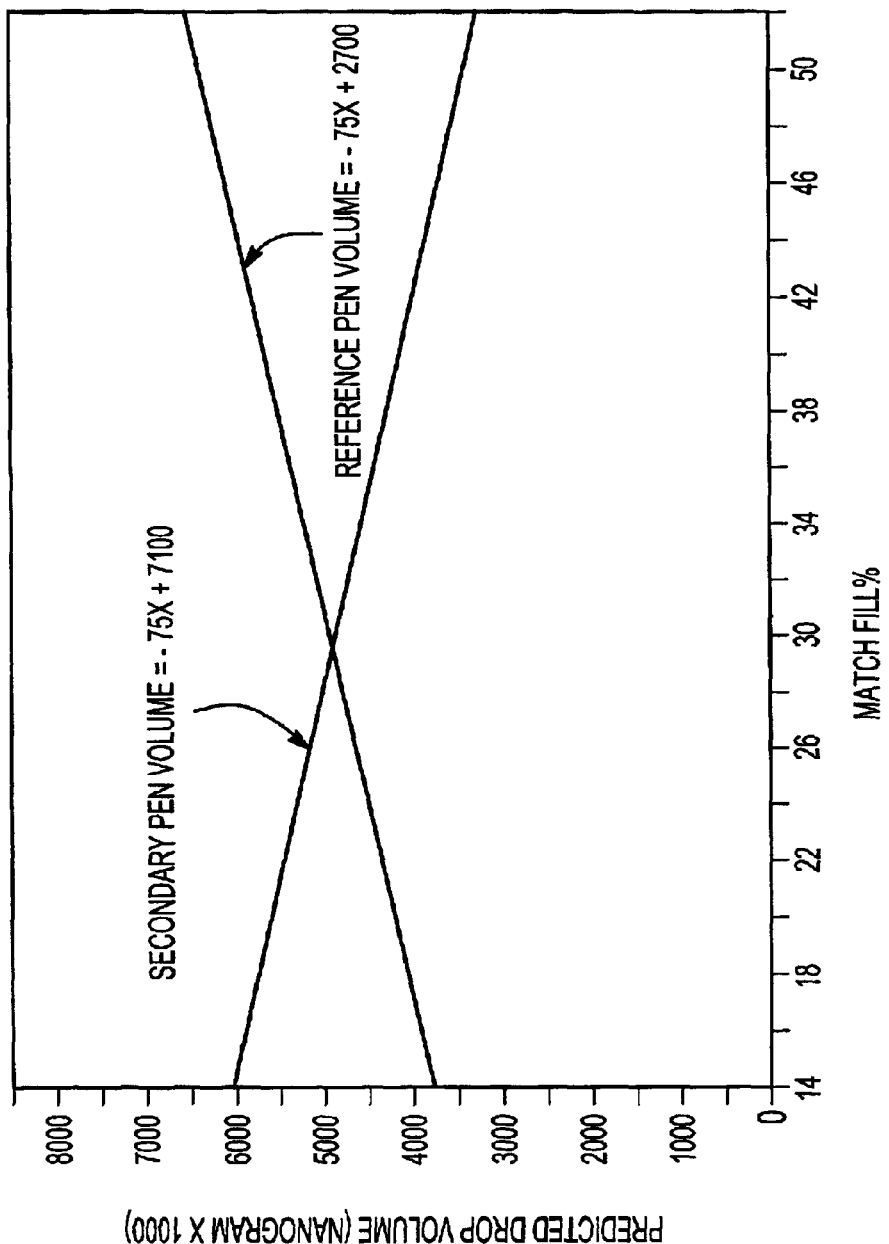
FIG. 5 is a graph illustrating an ideal relationship between the drop volumes and fill densities of matched pen pairs.

Illustrative equations (1) and (2) above are linear equations, and therefore the estimated drop quantity for both the reference and secondary pens can be represented by straight lines, as shown in FIG. 5. Note that values in Equations (1) and (2) are only one example of possible representations for the drop quantity. In practice, the equations can be determined empirically by evaluating many sets of pens and correlating to the fill % at the corresponding match position. Further, embodiments of the invention are not limited to the use of linear equations and other equations may also represent the drop volumes and may be determined or developed empirically, for instance, to better reproduce preferred color output. In an embodiment, the coefficients in Equations (1) and (2) may be determined empirically by generating test patterns for multiple pens and/or printers, varying each pen over its full operating range, determining the relationships between the reference and secondary pens that reduce the blue-yellow shift to an acceptable level, and empirically determining best fit equations linking the matched fill densities and the drop volumes corresponding to these relationships.

FIG. 5 illustrates the expected drop volumes of the reference pen and the secondary pen for a range of full densities. Referring to FIG. 5 with respect to the specific example explained above, the secondary pen fill density at the intersection point 404 is predicted to be 28–29% if the pens are properly calibrated with respect to each other (e.g., if the ratio is 5.0 nanograms primary/4.4 nanograms secondary). If the ratio between the drop quantity of the reference pen and the secondary pen is higher than the specified or desired ratio, the intersection point 404 will occur at a secondary pen fill density that is greater than 28–29%. Conversely, if the ratio is less than the specified or desired ratio, the intersection point 404 will occur at a secondary pen fill density that is less than 28–29% in this example. Of course, if the reference fill density is a different value, the actual values for a secondary pen fill density corresponding to the specified ratio will be different, but the characteristics indicating re-calibration will still be the same. In an embodiment, an actual re-calibration process may involve calculating drop quantity values for primary and secondary pens to yield a correct drop quantity difference that can be determined, such as from a test pattern. With the associated drop quantities for the pens, color maps or color rendering can be adjusted to shift the color output back towards nominal or preferred values.

Figure 6:
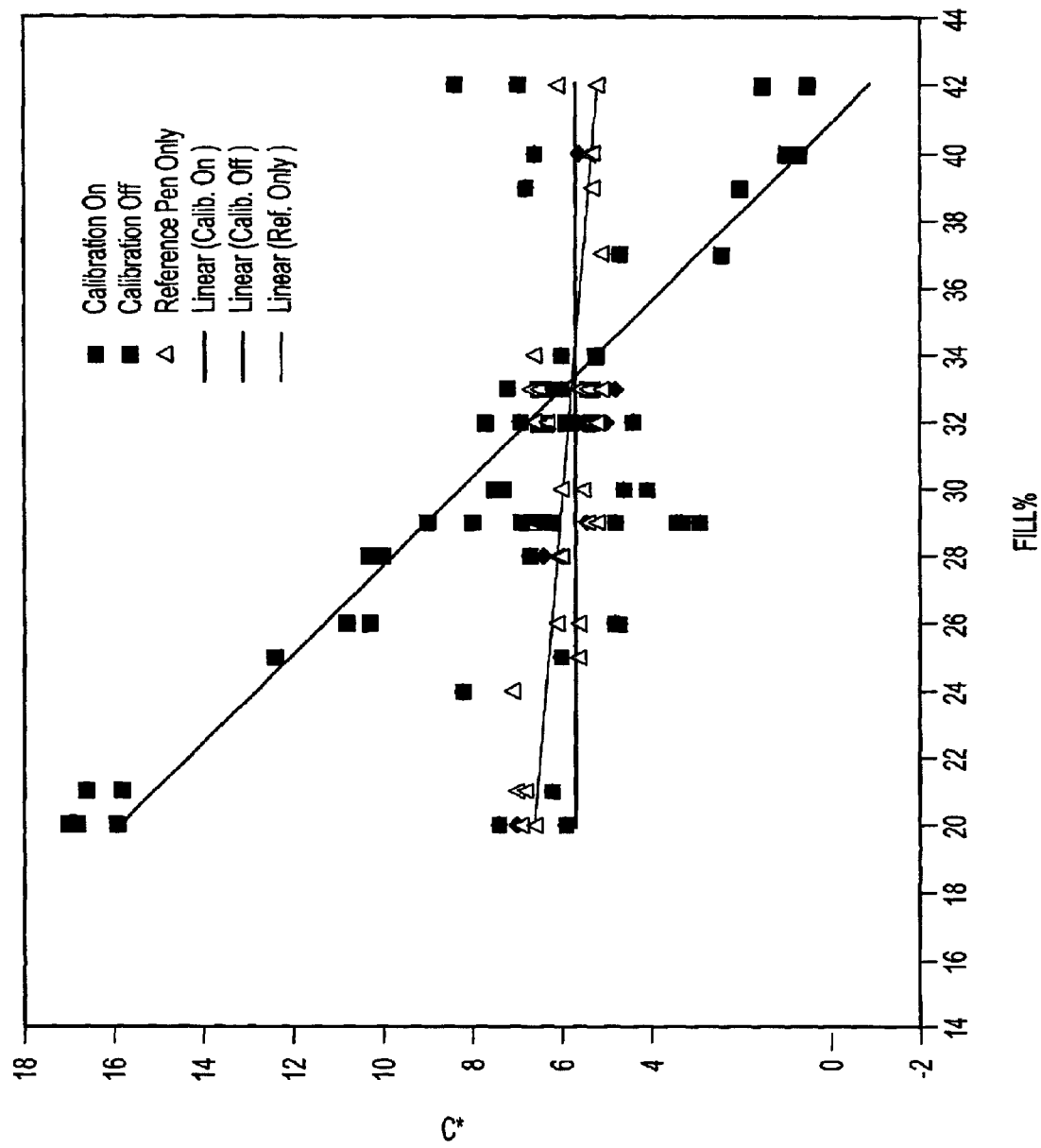
FIG. 6 is a graph illustrating the effect of drop volume calibration on chroma.

FIG. 6 is a graph illustrating one example of how the calibration. method and system can affect the chroma of a printed image. In this example, a gray block is printed with the inventive calibration system (turned on and with the calibration system turned off) and the graph illustrates the chroma value of the gray block versus the fill % or fill density. Such a graph permits one to attempt to match the reference pen, which for the current illustrative example, has a chroma of about 6. Uncompensated, the chroma for such a reference may vary from 0 to 17, with 0 being yellow-shifted and 17 being blue-shifted. With calibration, the variation can be reduced to about 3 to 9, i.e., about a threefold improvement in color variation.

As noted above, the scanning process and various calculations can be conducted using an optical sensor that, in an embodiment, sends its data to a printer controller for processing. FIG. 7 is a representative diagram of an optical sensor 600 that could be used in embodiments of the present invention. Various types of optical sensors 600 can be used in embodiments of the invention including, but not limited to, optical sensors having configurations similar to those generally described in commonly-assigned U.S. Pat. No. 6,062,137 to Guo et al. U.S. Pat. No. 6,036,298 to Walker, U.S. Pat. No. 6,312,075 to Walker, or U.S. Pat. No. 6,332,192 to Walker, the disclosures of which are incorporated herein by reference in their entirety.

In an embodiment, inkjet nozzles of the printheads are generally inline with the sensor 600 in the x-axis by fixedly mounting the sensor 600 appropriately on the carriage 109 (FIG. 1). Preferably, sensor 600 optically detects reflectivity values and provides electrical signals to the controller 103. As explained above, one or more light-emitting diodes ("LEDs") 602 can be mounted in the sensor 600 to illuminate at an angle to the plane of a printing zone in the printer 101. The LED 602 projects light onto the printed test pattern 300 and the light is then reflected to a photodetector 604. The LED 602 may include a die encapsulated in a transparent epoxy resin body that is conformed to define an output lens as an integral dome lens that directs light from the die into rays that form an illuminating beam 606. Optical sensing and analog-to-digital ("A/D") signal processing techniques may be applied to interpret the data received by the photodetector 604 and generate graphic outputs, such as the one shown in FIG. 4. The sensor 600 may be coupled to the processor 103 in the printer 101 or may have its own associated processor (not shown) to generate test pattern scan outputs for pen calibration.

Although some optical sensors in other applications may use multiple filters, an optical sensor 600 used in an embodiment of the invention may, if desired, include only one filter because embodiments of the invention measures spectral response of the test pattern 300 using a narrow band light source (e.g., 420–470 nm in the example described above). The embodiment would therefore use a filter covering the narrow band and would not need multiple filters to accommodate one or more light sources covering a broad band.

The illuminating beam 606 from the LED 602 is transmitted to the test pattern 300 and thereafter it is reflected off the test pattern 300 as a reflected light beam 610. In an embodiment, the area illuminated by the LED 602 is slightly larger than the viewing field of the photodetector 604 to better illuminate a selected viewing region by the LED 602. The reflected light beam 610 then enters a condenser lens 612, which focuses the reflected light beam 610 into the photodetector 604. In an embodiment, the condenser lens 612 has a focal length of approximately 5 mm (millimeters), but other focal lengths may also be selected in other optical sensor configurations and implementations having different packaging and placements of the sensor components. The photodetector 604 then generates an output signal to the printer controller 102 for analysis to generate the test pattern scan, such as the test pattern scan in FIG. 4.

Although the description above focuses on detecting drop quantity variations between pens in a multiple-pen or multi-chamber printhead, embodiments of the invention may be used to detect variations between multiple chambers in a single pen as well. Embodiments of the invention can be applied to, for example, a six-ink printer with one pen having high dye-load cyan, yellow and magenta ink and one pen having low dye-load cyan and magenta inks and a black ink. Embodiments of the invention can be used in any application that uses multiple ink sources to balance drop volume difference between two ink sources to give a correct hue of the color output.

While embodiments of the present invention have been particularly shown and described, it should be understood by those skilled in the art that various alternatives to the embodiments of the invention described herein may be employed without departing from the spirit and scope of the invention as defined in the following claims. It is intended that the following claims define the scope of the invention and that the method and apparatus within the scope of these claims and their equivalents be covered thereby. This description of embodiments of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method of calibrating a device having a first fluid source that ejects a first drop quantity and a second fluid source that ejects a second drop quantity, comprising:

printing a pattern having a first portion and a second portion, wherein the first portion is printed by the first fluid source and the second portion is printed by the second fluid source;

scanning the pattern to obtain a signal response;

obtaining a relationship between the first drop quantity and the second drop quantity from the pattern based on the signal response, the signal response including a first portion response and a second portion response, and wherein the obtaining of the relationship includes comparing the first portion response with the second portion response, determining an intersection point between a calculated value of the first portion response and the second portion response, and determining the fill density of the first portion at the intersection point; and adjusting data used to determine quantities of fluid to eject from the first fluid source or the second fluid source based on the relationship between the first drop quantity and the second drop quantity.

2. A method of calibrating a device having a first fluid source that ejects a first drop quantity and a second fluid source that ejects a second drop quantity, comprising:

printing a pattern having a first portion and a second portion, wherein the first portion is printed by the first fluid source and the second portion is printed by the second fluid source;

scanning the pattern to obtain a signal response, the signal response including a first portion response and a second portion response;

obtaining a relationship between the first drop quantity and the second drop quantity from the pattern based on the signal response by comparing the first portion response with the second portion response; and adjusting data used to determine quantities of fluid to eject from the first fluid source or the second fluid source based on the relationship between the first drop quantity and the second drop quantity;

wherein the first portion has a fixed fill density and the second portion has a varying fill density and wherein the second portion includes a plurality of tiles, each tile having a different fill density, and wherein the act of determining a fill density of the second portion includes locating the tile having the fill density corresponding to the fill density of the first portion.

3. A method comprising:

printing a test pattern having a reference portion and a test portion, wherein the reference portion is printed by a first fluid source and the test portion is printed by a second fluid source;

scanning the test pattern to obtain data;

obtaining a relationship between a first drop volume of the first fluid source and a second drop volume of the second fluid source from the test pattern based on the data; and adjusting at least one value in a color map using the relationship between the first drop volume and the second drop volume.

4. The method of claim 3, wherein the data includes reference portion data and test portion data, and wherein the the relationship between a first drop volume of the first fluid source and a second drop volume of the second fluid source is obtained by comparing the reference portion data with the test portion data.

5. The method of claim 4, wherein the relationship between a first drop volume of the first fluid source and a second drop volume of the second fluid source is obtained by:

determining an intersection point between a reference line determined from the reference portion data and the test portion data; and determining the fill density of the test portion at the intersection point.

6. A method comprising:

printing a test pattern having a reference portion and a test portion wherein the reference portion is printed by a first fluid source and the test portion is printed by a second fluid source, the reference portion has a fixed fill density and the test portion has a varying fill density;

scanning the test pattern to obtain data, the data including reference portion data and test portion data;

obtaining a relationship between a first drop volume of the first fluid source and a second drop volume of the second fluid source from the test pattern based on the data and comparing the reference portion data with the test portion data; and adjusting at least one value in a color map using the relationship between the first drop volume and the second drop volume, wherein the test portion is divided into a plurality of test tiles, each test tile having a different fill density, and wherein determining the fill density of the test portion includes determining the test tile having the fill density substantially equal to the fill density of the reference portion.

7. A calibration apparatus for a device having a first fluid source to eject a first drop quantity to form a first region and a second fluid source to eject a second drop quantity to form a second region, comprising:

an optical sensor to generate output from scanning the first region and the second region; and a processor arranged to receive the output, wherein the processor includes a configuration to determine a relationship between the first drop quantity and the second drop quantity using the output.

8. The calibration apparatus of claim 7, wherein the optical sensor includes a light source to at least partially illuminate the pattern.

9. The calibration apparatus of claim 7, wherein the processor includes a configuration to change data specifying quantities of fluid to eject from the first fluid source or the second fluid source based upon the relationship.

10. The calibration apparatus of claim 7, wherein the processor includes a configuration to determine whether a ratio between the first drop quantity and the second drop quantity deviates from a specified ratio.

11. The calibration apparatus of claim 7, wherein the output includes a first response corresponding to the first region and a second response corresponding to the second region, and wherein the processor includes a configuration to obtain the relationship by comparing the first response with the second response.

12. The calibration apparatus of claim 11, wherein the processor includes a configuration to determine an intersection point between a first value determined from the first response and a second value determined from the second response and to determine the fill density of the second region at the intersection point.

13. The calibration apparatus of claim 11, wherein the processor includes a configuration to determine a fit line using at least a part of the second response to determine an intersection point at an intersection between the fit line and a line corresponding to a calculated value of the first response and to determine the fill density of the second region.

14. The calibration apparatus of claim 11, wherein the first region has a fixed fill density and the second region has a varying fill density.

15. The calibration apparatus of claim 11, wherein the processor includes a configuration to determine a fill density of the second region corresponding to a fill density of the first region and calculates the second drop quantity from the fill density of the second region.

16. The calibration apparatus of claim 15, wherein the second region is divided into a plurality of tiles, each tile having a different fill density, and wherein the processor includes a configuration to determine a fill density of the second region by locating the tile having the fill density corresponding to the fill density of the reference portion.

17. An imaging system, comprising:
at least a first fluid source and a second fluid source that eject fluid onto a print medium to form an image, the first fluid source for ejecting a first drop volume and the second fluid source for ejecting a second drop volume;
an optical sensor that scans a test pattern having a reference portion and a test portion and generates a sensor output, wherein the reference portion is printed by the first fluid source and the test portion is printed by the second fluid source; and
a processor coupled to the optical sensor to receive the sensor output, wherein the processor includes a configuration to obtain a relationship between the first drop volume and the second drop volume from the test pattern and a configuration to adjust at least one value in a color map.

18. The imaging system of claim 17, wherein the processor includes a configuration to determine whether a ratio between the first drop volume and the second drop volume deviates from a specified ratio.

19. The imaging system of claim 17, wherein the sensor output includes a reference portion response and a test portion response, and wherein the processor includes a configuration to obtain the relationship by comparing the reference portion response with the test portion response.

20. The imaging system of claim 19, wherein processor includes a configuration to determine an intersection point between the reference portion response and the test portion response and to determine the fill density of the test portion at the intersection point.

21. The imaging system of claim 20, wherein the processor includes a configuration to determine a fit line along at least a part of the signal response of the test portion and adjusts the intersection point to be the intersection between the fit line and the calculated signal response of the reference portion.

22. The imaging system of claim 17, wherein the processor includes a configuration to determine a fill density of the test portion corresponding to a fill density of the reference portion and calculates the second drop volume from the fill density of the test portion.

23. The imaging system of claim 22, wherein the test portion is divided into a plurality of test tiles, each test tile having a different fill density, and wherein the processor determines a fill density of the test portion by locating the test tile having the fill density corresponding to the fill density of the reference portion.

24. The imaging system of claim 17, wherein the first fluid source is a high dye-load pen and the second fluid source is a low dye-load pen.

25. The imaging system of claim 17, wherein the first fluid source and the second fluid source are pens in a multiple-pen printhead.

26. The imaging system of claim 17, wherein the system is selected from the group consisting of a printer, a copier, a fax machine, and an all-in-one imaging device.

* * * * *